United States Patent [19]

Christe et al.

[11] 4,410,377

[45] Oct. 18, 1983

[54] NF$_3$-F$_2$ GAS GENERATOR COMPOSITIONS

[75] Inventors: Karl O. Christe, Calabasas; William W. Wilson, Canoga Park, both of Calif.

[73] Assignee: The United States of America as represented by the Secretary of the Army, Washington, D.C.

[21] Appl. No.: 361,638

[22] Filed: Mar. 25, 1982

[51] Int. Cl.$^3$ .............................................. C06B 43/00
[52] U.S. Cl. .................................. 149/109.4; 149/119
[58] Field of Search ............................. 149/109.4, 119

[56] References Cited

U.S. PATENT DOCUMENTS

| | | | |
|---|---|---|---|
| 3,325,318 | 6/1967 | Pauliukonis | 149/109 |
| 3,980,509 | 9/1976 | Lubowitz et al. | 149/19.3 |
| 4,001,136 | 1/1977 | Channell et al. | 149/119 |
| 4,003,771 | 1/1977 | Lubowitz | 149/17 |
| 4,108,965 | 8/1978 | Christe | 423/351 |
| 4,152,406 | 5/1979 | Christe et al. | 423/351 |
| 4,172,881 | 10/1979 | Christe et al. | 423/301 |
| 4,284,617 | 8/1981 | Bowen et al. | 423/504 |

Primary Examiner—Edward A. Miller
Attorney, Agent, or Firm—Robert P. Gibson; Anthony T. Lane; Jack W. Voigt

[57] ABSTRACT

Improved compositions are described for solid propellant NF$_3$-F$_2$ gas generators using (NF$_4$)$_2$TiF$_6$ and clinkering agents derived from LiF, KF, and NaF, either alone or in mixtures.

6 Claims, No Drawings

NF₃-F₂ GAS GENERATOR COMPOSITIONS

DEDICATORY CLAUSE

The invention described herein was made in the course of or under a contract or subcontract thereunder with the Government and may be manufactured, used, and licensed by or for the Government for governmental purposes without the payment to us of any royalties thereon.

BACKGROUND OF THE INVENTION

1. Field of the Invention

This invention relates to improved compositions for solid propellant $NF_3$-$F_2$ gas generators, useful, for example, in chemical HF-DF lasers.

2. Description of Prior Art $NF_4+$ salts are the key ingredients for solid propellant $NF_3$-$F_2$ gas generators, as shown by D. Pilipovich in U.S. Pat. No. 3,963,542. These propellants consist of a highly over-oxidized grain using $NF_4+$ salts as the oxidizer. Burning these propellants with a small amount of fuel, such as aluminum powder, generates sufficient heat to thermally dissociate the bulk of the oxidizer. This is shown for $NF_4BF_4$ in the following equation:

$$NF_4BF_4 \rightarrow NF_3 + F_2 + BF_3$$

As can be seen from the equation the gaseous combustion products contain the volatile Lewis acid $BF_3$. This disadvantage of a volatile Lewis acid byproduct is shared by most known $NF_4+$ compositions. These volatile Lewis acids possess a relatively high-molecular weight and a low $\gamma$ value ($\gamma = C_{pi}/C_{vi}$), relative to the preferred diluent helium and frequently act as a deactivator for the chemical HF-DF laser. Consequently, these volatile Lewis acids must be removed from the generated gas prior to its use in an efficient chemical laser. Based on the state of the art, heretofore, this would be achieved by adding a clinker forming agent, such as KF, to the solid propellant formulation. The function of this additive served to convert the volatile Lewis acid, such as $BF_3$, to a non-volatile salt as shown by the following equation:

$$KF + BF_3 \rightarrow KBF_4$$

Since the addition of KF significantly increases the weight of the formulation while the amount of evolved $NF_3$ and $F_2$ remains the same, the yield of $NF_3$ and $F_2$ per pound of formulation is decreased. For $NF_4BF_4$ based formulations, the replacement of KF by the lighter alkali metal fluorides NaF or LiF would theoretically improve the obtainable $NF_3$-$F_2$ yield, but was found to be impractical due to the insufficient thermal stability of $NaBF_4$ and $LiBF_4$, resulting in incomplete clinkering of the $BF_3$.

The use of self-clinkering formulations based on $(NF_4)_2TiF_6$ has previously been proposed by Christe et al (U.S. Pat. No. 4,152,406) as means of increasing the theoretically obtainable $NF_3$-$F_2$ yield relative to that of the state of the art $NF_4BF_4\cdot1.2KF$ formulation. However, test firings of $(NF_4)_2TiF_6$ based formulations showed that the relatively high volatility of $TiF_4$ (boiling point of 284° C.) resulted in the deposition of $TiF_4$ throughout the whole gas generator system. To eliminate $TiF_4$ from the generated gas, KF had to be added to the $(NF_4)_2TiF_6$ based formulations. This necessary KF addition lowered the theoretically obtainable $NF_3$-$F_2$ yield to a value of 39.5 weight % which is comparable to that of 38.5 weight % of the KF clinkered $NF_4BF_4$ system and thus eliminated most of the improvement offered by the use of $(NF_4)_2TiF_6$.

BRIEF SUMMARY AND OBJECTS OF THE INVENTION

The above described problem of obtaining an $(NF_4)_2TiF_6$ based formulation of significantly higher performance than that offered by the state of the art $NF_4BF_4\cdot1.2KF$ system is overcome by the present invention. We have found that, contrary to $NF_4BF_4$, $(NF_4)_2TiF_6$ forms thermally stable clinkers with the lighter alkali metal fluorides NaF and LiF and that less than stoichiometric amounts of these alkali metal fluorides are required for the formation of a stable clinker due to the ability of $TiF_4$ to form polytitanate anions. The improvements resulting from this concept are summarized in Table 1.

TABLE I

| Theoretical Yields of Usable Fluorine | |
|---|---|
| System | F Yield (Weight %) |
| $NF_4BF_4\cdot1.2KF$ | 38.7 |
| $(NF_4)_2TiF_6\cdot2.4KF$ | 39.5 |
| $(NF_4)_2TiF_6\cdot2.4NaF$ | 42.9 |
| $(NF_4)_2TiF_6\cdot2.4LiF$ | 47.0 |
| $(NF_4)_2TiF_6\cdot1.2NaF$ | 48.4 |
| $(NF_4)_2TiF_6\cdot1.2LiF$ | 50.9 |

Accordingly, it is an object of the present invention to provide high performing solid propellant $NF_3$-$F_2$ gas generator formulations based on $(NF_4)_2TiF_6$ and low molecular weight alkali metal fluorides.

This and other objects and features of the present invention will be apparent from the following examples. It is understood, however, that these examples are merely illustrative of the invention and should not be considered as limiting the invention in any sense.

DETAILED DESCRIPTION OF THE INVENTION

EXAMPLE 1

A formulation containing 81.44 weight % $(NF_4)_2TiF_6$, 14.71 weight % LiF and 3.83 weight % Al was fired in a typical gas generater. Smooth burning was observed. Disassembly of the generator after completion of the test showed that the desired clinker had formed in the combustion chamber with essentially no $TiF_4$ deposited in the coolant pack section of the generator. The clinker was shown by chemical analysis and vibrational spectroscopy to consist mainly of $M_2TiF_6$ where M is Li.

EXAMPLE 2

A formulation containing 85.2 weight % $(NF_4)_2TiF_6$, 3.8 weight % LiF, 8.5 weight % KF and 2.5 weight % Al was fired in a typical gas generator. Again essentially complete clinkering of the $TiF_4$ was observed and the clinker was shown by elemental and spectroscopic analysis to consist mainly of $M_2Ti_2F_{10}$ where M is Li and/or K.

EXAMPLE 3

A formulation containing 86.0 weight % $(NF_4)_2TiF_6$, 7.3 weight % NaF, 6.7 weight % KF and 2.5 weight % Al was fired in a typical gas generator. Again essentially complete clinkering of the TiF$_4$ was observed and the clinker was shown by elemental and spectroscopic analyses to consist mainly of M$_2$Ti$_2$F$_{10}$ where M is Na and/or K.

Obviously, numerous variations and modifications may be made without departing from the present invention. Accordingly, it should be clearly understood that the forms of the present invention described above are illustrative only and are not intended to limit the scope of the present invention.

We claim:

1. Solid propellant NF$_3$-F$_2$ gas generator composition comprising (NF$_4$)$_2$TiF$_6$ with LiF as a clinker forming agent.

2. Solid propellant NF$_3$-F$_2$ gas generator compositions according to claim 1 wherein the mole ratio of LiF to (NF$_4$)$_2$TiF$_6$ is from 1 to 2.4.

3. Solid propellant NF$_3$-F$_2$ gas generator composition comprising (NF$_4$)$_2$TiF$_6$ with NaF as a clinker forming agent.

4. Solid propellant NF$_3$-F$_2$ gas generator compositions according to claim 3 wherein the mole ratio of NaF to (NF$_4$)$_2$TiF$_6$ is from 1 to 2.4.

5. Solid propellant NF$_3$-F$_2$ gas generator compositions comprising (NF$_4$)$_2$TiF$_6$ with mixtures of LiF with heavier alkali metal fluorides MF, where M is selected from Na and K, as a clinker forming agent.

6. Solid propellant NF$_3$-F$_2$ gas generator compositions according to claim 5 wherein the mole ratio of LiF and MF to (NF$_4$)$_2$TiF$_6$ is from 1 to 2.4.

* * * * *